(12) United States Patent
Rosenstrom (10) Patent No.: US 6,269,940 B1
(45) Date of Patent: *Aug. 7, 2001

(54) REVERSING CONVEYING BRUTE FORCE VIBRATORY FEEDER

(75) Inventor: Bo Richard Rosenstrom, Elizabethtown, KY (US)

(73) Assignee: Carrier Vibrating Equipment, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/387,183

(22) Filed: Aug. 31, 1999

Related U.S. Application Data (60) Provisional application No. 60/131,131, filed on Apr. 27, 1999.

(51) Int. Cl.$^7$ .................................................... B65G 27/32
(52) U.S. Cl. .................................... 198/753; 198/750.8
(58) Field of Search ............................... 198/750.8, 770, 198/759, 753

(56) References Cited

U.S. PATENT DOCUMENTS

| 4,267,919 | 5/1981 | Schrader . |
| 5,056,652 | 10/1991 | Kraus et al. . |
| 5,064,053 | 11/1991 | Baker . |
| 5,094,342 | 3/1992 | Kraus et al. . |
| 5,178,259 | 1/1993 | Musschoot . |
| 5,409,101 | 4/1995 | Ahmed et al. . |
| 5,615,763 | 4/1997 | Schieber . |
| 5,713,457 | 2/1998 | Musschoot . |
| 6,024,210 | * 2/2000 | Rosenstrom ........................ 198/758 |
| 6,145,652 | * 11/2000 | Durnil ................................ 198/753 |

* cited by examiner

*Primary Examiner*—Joseph E. Valenza
*Assistant Examiner*—Joe Dillon, Jr.
(74) *Attorney, Agent, or Firm*—Vance A. Smith; Stites & Harbison, PLLC (57) ABSTRACT

The present invention relates to a mechanical vibrating drive system for supplying a consistent, elliptical driving force to a conveyor trough. In a preferred embodiment of the invention, the vibrating conveyor has three parallel shafts, the intermediate shaft being located at the center of gravity for the vibrating conveyor, and the shafts are driven such that the outer shafts rotate in one direction while the intermediate shaft rotates in the opposite direction from the outer shafts. Each of the shafts bears essentially equal weight. The net result is a force output from the drive module that produces a uniform elliptical vibratory motion throughout the length of the conveyor trough. By reversing the motor, a symmetric elliptical motion for moving product in the opposite direction is generated without any further adjustments to the weights or shafts.

11 Claims, 5 Drawing Sheets

| TIME | 22a | 20a | 18a |
|---|---|---|---|
| $t_0$ | | | |
| $t^{\pi/4}$ | | | |
| $t^{\pi/2}$ | | | |
| $t^{3\pi/4}$ | | | |
| $t\pi$ | | | |
| $t^{5\pi/4}$ | | | |
| $t^{3\pi/2}$ | | | |
| $t^{7\pi/4}$ | | | |

FIG. 4

| TIME | 22a | 20a | 18a | RESULTING TROUGH MOTION |
|---|---|---|---|---|
| $t_0$ | | | | |
| $t\pi/4$ | | | | |
| $t\pi/2$ | | | | |
| $t3\pi/4$ | | | | |
| $t\pi$ | | | | |
| $t5\pi/4$ | | | | |
| $t3\pi/2$ | | | | |
| $t7\pi/4$ | | | | |

FIG. 5

REVERSING CONVEYING BRUTE FORCE VIBRATORY FEEDER

This application claims a benefit of Provisional No. 60/131,131, filed Apr. 27, 1999.

BACKGROUND OF THE INVENTION

This invention is related to a mechanical vibrating drive system for a vibratory conveyor apparatus and, more particularly, to a vibratory conveyor apparatus utilizing a set of eccentric rotating weights to impart a resultant vibratory drive force to the conveyor apparatus.

There are various vibrating drive systems for controlling the direction and/or speed of product being carried by a vibratory conveyor. The vibrating conveyor apparatus typically includes a trough mounted for vibratory motion, such as provided by a plurality of springs. In general, product is moved along the conveyor trough by a force applied to the trough. The product can be moved along a linear path or along an elliptical path, the path being determined by the force applied to the conveyor trough.

One type of vibrating drive system is a mechanical system utilizing fixed eccentric rotating weights and a phase angle adjustment means. A system of this type is described in detail in U.S. Pat. No. 5,064,053, assigned to the same assignee as the present invention. In the system of the '053 patent, a single rotating shaft bearing an eccentric weight is in a parallel relationship with and positioned between paired additional rotating shafts bearing eccentric weights. The centered single shaft rotates in one direction while the paired shafts rotate in the opposite direction but at the same number of revolutions per minute. When the shafts rotate, the weights impart a force to the conveyor trough which, in turn, causes the product to move along the conveyor. Because the force to move the product is supplied by the eccentric weights, the force generated in insensitive to the product load on the conveyor. Thus, there is a consistent force generated by the drive system regardless of the type or quantity of product that is conveyed. The user can reverse the direction in which the material is being conveyed, but to ensure that product moves along the desired path requires physically changing the positioning of one or more of the eccentric weights and its associated shaft by repositioning the phase angle adjustment means. This change-over requires considerable down time, which is highly undesirable when time is a critical factor in the application.

A second type of vibrating drive system is a mechanical system that uses a reversible motor and dynamic balancers to produce the driving forces. A system of this type is described in U.S. Pat. No. 5,713,457, assigned to General Kinematics Corporation. In the system of the '457 patent, a reversible motor with a rotary output shaft and eccentric weight is mounted near the center of gravity on a conveyor apparatus, and a dynamic balancer is positioned at each end of the conveyor trough. The dynamic balancers are spring and weight systems designed to move the product in an elliptical path as it travels along the conveyor trough. For optimum performance, the dynamic balancers (or absorbers) must be selected such that their natural frequency is just greater than the operational frequency of the system as determined by the frequency of the motor. Maintaining a consistent driving force can be difficult with this type of system because the dynamic balancers are very highly tuned, so small changes in product load may affect the performance of the equipment. In particular, the user must be cautious of producing overstrokes that can permanently damage the conveying equipment. As with the eccentric weight systems, the user can reverse the direction of product flow in the system of the '457 patent by reversing the motor. However, because the dynamic balancers are set only for one speed, to make any changes in the system other than reversing the direction of product flow requires that the system be completely modified, which can result in considerable down time.

Eccentric weight systems that include electronic drive capabilities, such as described in U.S. Pat. No. 5,615,763, assigned to the same assignee as the present invention, allow for a rapid change of direction of the product flow. However, such systems are expensive relative to the cost of mechanical systems.

Thus, there is a paramount need for an inexpensive mechanical vibrating drive system that will allow the user to easily and frequently change the direction of flow of the conveyed product without incurring the down time of the system heretofore necessary with prior art mechanical vibrating drive systems. In addition, there is a need for an inexpensive eccentric weight drive system that will allow the user to convey product along a reversible, symmetric, elliptical path as it travels along the conveyor trough.

SUMMARY OF THE INVENTION

The present invention relates to a mechanical vibrating drive system for supplying a consistent, elliptical driving force to a conveyor trough. The mechanism for supplying the force to vibrate the trough includes three parallel shafts with fixed eccentric weights, the weights being selected and positioned on the shafts such that the sum of the forces generated by the outermost weights is unequal to the force generated by the intermediate weight. The shafts are interconnected with a serpentine gear belt that drives the two outermost shafts in a counter rotation direction relative to the intermediate shaft. A standard reversing type motor is used to drive the shafts in either a forward or a reverse direction.

In a preferred embodiment of the invention, the three parallel shafts carry weights of essentially equal masses, and the intermediate shaft is located at the center of gravity for the vibrating conveyor. The net result is a force output from the drive module that produces a uniform elliptical vibratory motion throughout the length of the conveyor trough. By reversing the motor, a symmetric elliptical motion for moving product in the opposite direction is generated without any further adjustments to the weights or shafts.

DETAILED DESCRIPTION OF THE DRAWINGS

DETAILED DESCRIPTION OF THE PREFERRED EMBODIMENT

The conveyor system depicted in the various Figures is a three shaft eccentric weight system driven by a single motor and is selected solely for the purposes of illustrating the invention. Other and different eccentric weight conveyor systems may utilize the inventive features described herein as well. Further, a plurality of systems can be utilized in a series along a single long conveyor. It is understood that the systems would need to be synchronized by a control system such as described in U.S. Pat. {application Ser. No. 08/985, 140}, which is incorporated herein by reference, to operate cooperatively in this arrangement.

Figures 1, 1A:
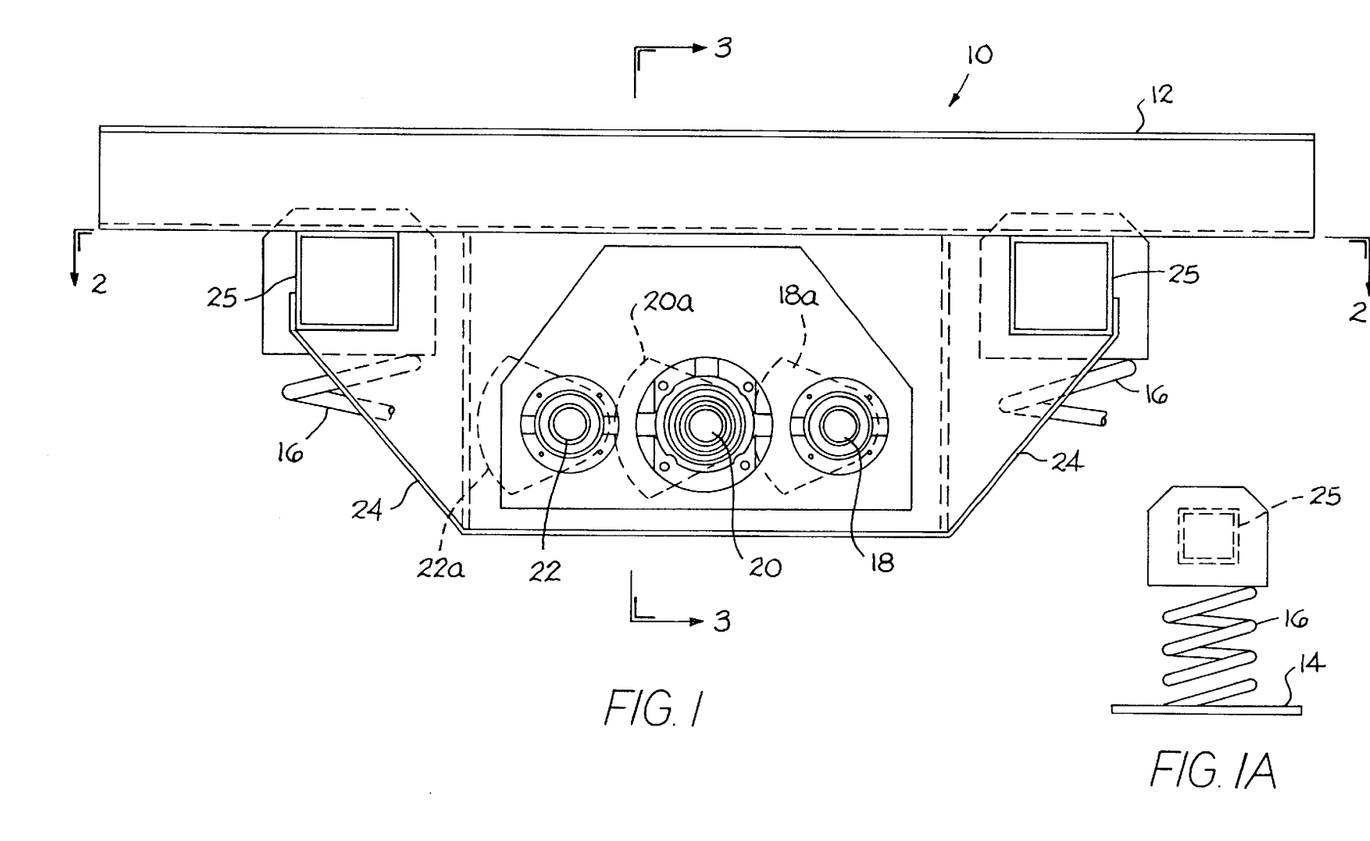
FIG. 1 is a schematic of an embodiment of the present invention showing a side view of a mechanical vibratory conveyor apparatus having eccentric weights mounted on rotating shafts to impart a vibratory motion to the conveying trough.
FIG. 1A is a schematic showing a side view of a spring member.
Figure 2:
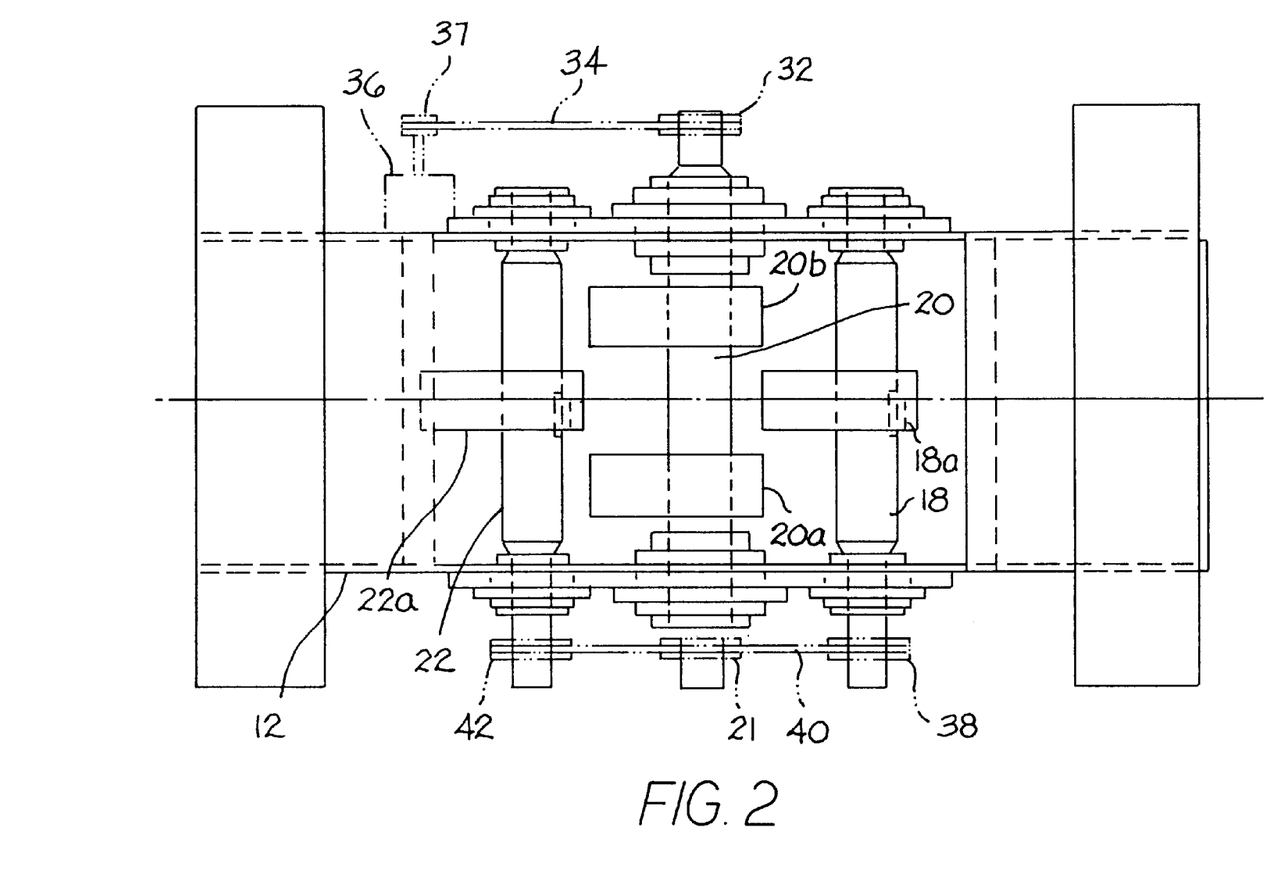
FIG. 2 is bottom view of the vibratory apparatus of the present invention showing the respective location of the eccentric weights and shaft driving elements.
Figure 3:
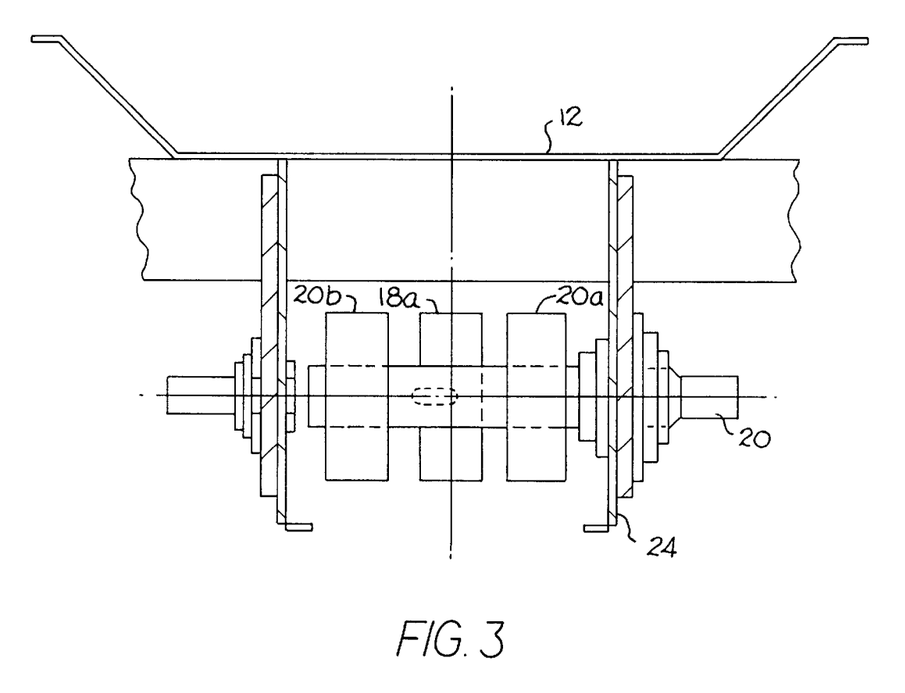
FIG. 3 is a sectional view of the apparatus illustrated in FIG. 1 along lines 3—3.

Reference is first made to FIGS. 1 through 3 in which the three shaft eccentric weight conveyor system constructed in accordance with the present invention is generally noted by the character numeral 10. A vibratory trough or conveyor pan 12 is mounted to a frame 24 by square structural tubing 25. The pan 12 is isolated from a stationary base 14 by a plurality of isolating springs 16, which comprise a portion of the frame 24, as shown in FIG. 1A. As shown in FIG. 1, three shafts 18, 20 and 22, are mounted for rotational movement within the frame 24, preferably secured to the undercarriage of conveyor pan 12. Alternatively, the shafts 18, 20, 22 can be mounted for rotational movement within a second frame (not shown), secured above the carriage of the pan 12. In a preferred embodiment, the three shafts 18, 20 and 22, are mounted within the frame 24 secured to the undercarriage of conveyor pan 12, and the intermediate shaft 20 is positioned at the center of gravity for the vibrating conveyor 10.

Figure 2A:
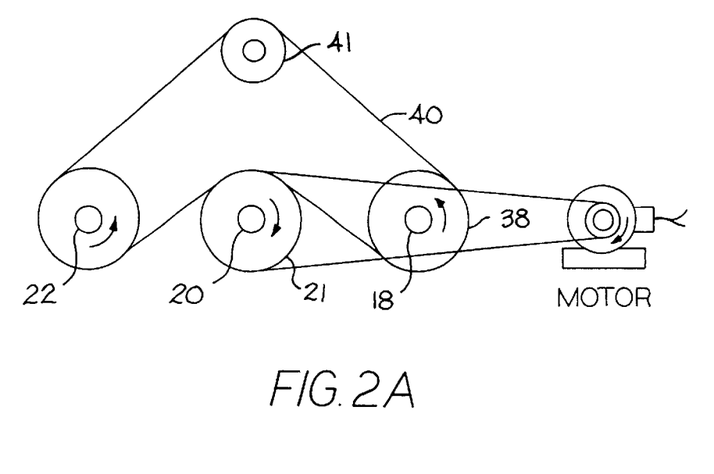
FIG. 2A is a schematic showing the central shaft being driven by a single motor and in turn driving the two outboard shafts in an opposite rotational direction.

As shown in FIGS. 2 and 2A, a single motor 36 is used to drive all three shafts 18, 20, 22. A belt 34 connects a pulley 37 on the motor 36 with a pulley 32 which is connected to shaft 20. The other end of shaft 20 has a central sheave 21 that drives a double sided gear belt 40, which simultaneously drives pulley 38, connected to shaft 18, and pulley 42 connected to shaft 22. An idler 41 provides the proper tension to the gear belt 40. As indicated by the directional arrows, shown in FIG. 2A, as the shafts 18 and 22 are driven in a first direction, shaft 20 is driven in the opposite rotational direction. Thus, the single motor 36 drives all three shafts 18, 20, 22, with intermediate shaft 20 moving in the opposite rotational direction as the outermost shafts 18, 22.

Referring again to FIGS. 1, 2 and 3, an eccentrically mounted weights 18a, 22a are positioned intermediate the ends thereof and rigidly fixed to the shafts 18, 22, respectively. The intermediate shaft 20 bears eccentrically mounted weights 20a, 20b, which are positioned intermediate the ends thereof and rigidly fixed to the shaft 20, with sufficient separation between the weights 20a, 20b that the weights 20a, 20b does not interfere with the rotation of the weights 18a, 22a. The single weight 18—double weight 20a, 20b—single weight 22a configuration shown in the Figures is for illustrative purposes only. Alternatively, each shaft 18,20,22 could bear only a single weight 18a, 20a, 22a, respectively (not shown), or a plurality of weights can be fixed to one or more of the shafts 18, 20, 22 (also not shown), provided the weights are sized and positioned on the shaft such that the weights do not interfere with each other as they rotate, and the combined mass and resultant driving force meet the criteria set forth below.

As described in greater detail in U.S. Pat. No. 5,064,053, which is incorporated herein by reference, as the weights 18a, 20a, 20b, 22a rotate about their respective shafts 18, 20, 22, each weight contributes a driving force component, which is a function of the magnitude and the direction of that weight, to the net driving force directed toward the conveyor pan 12. The net driving force, then, is the summation of the individual force components, and can be reduced to a resultant magnitude component and a resultant direction component. This net driving force is transferred to the pan 12 which, in turn, transfers the force to the product on the pan 12 causing the product to move. When the weights 18a, 20a, 20b, 22a are balanced and oriented on the shafts 18, 20, 22 such that the resultant direction component of the net driving force varies linearly as the weights rotate, a linear driving force is directed at the pan 12. If the resultant direction component varies non-linearly as the weights rotate, an elliptical driving force is directed at the pan 12.

Tables are used herein to show the effect of varying weight masses, and/or the angular orientation of the weights, on the resultant direction and the resultant driving force as the weights 18a, 20a, 20b, 22a rotate 360° about the shafts 18, 20, 22. Each table provides the conditions (the masses of the weights and the initial angular orientation), the angular orientation of the weights at various times, $t_x$, and the resultant direction and resultant driving force at the various times $t_x$. The table heading "#REV" indicates that the conditions are essentially identical at time $t_0$ as for the related table number (Table #), but that the motor has been reversed, with no other changes to the weights 18a, 20a, 20b, 22a or shafts 18, 20, 22.

Linear Motion of the Vibratory Trough

Figure 4:
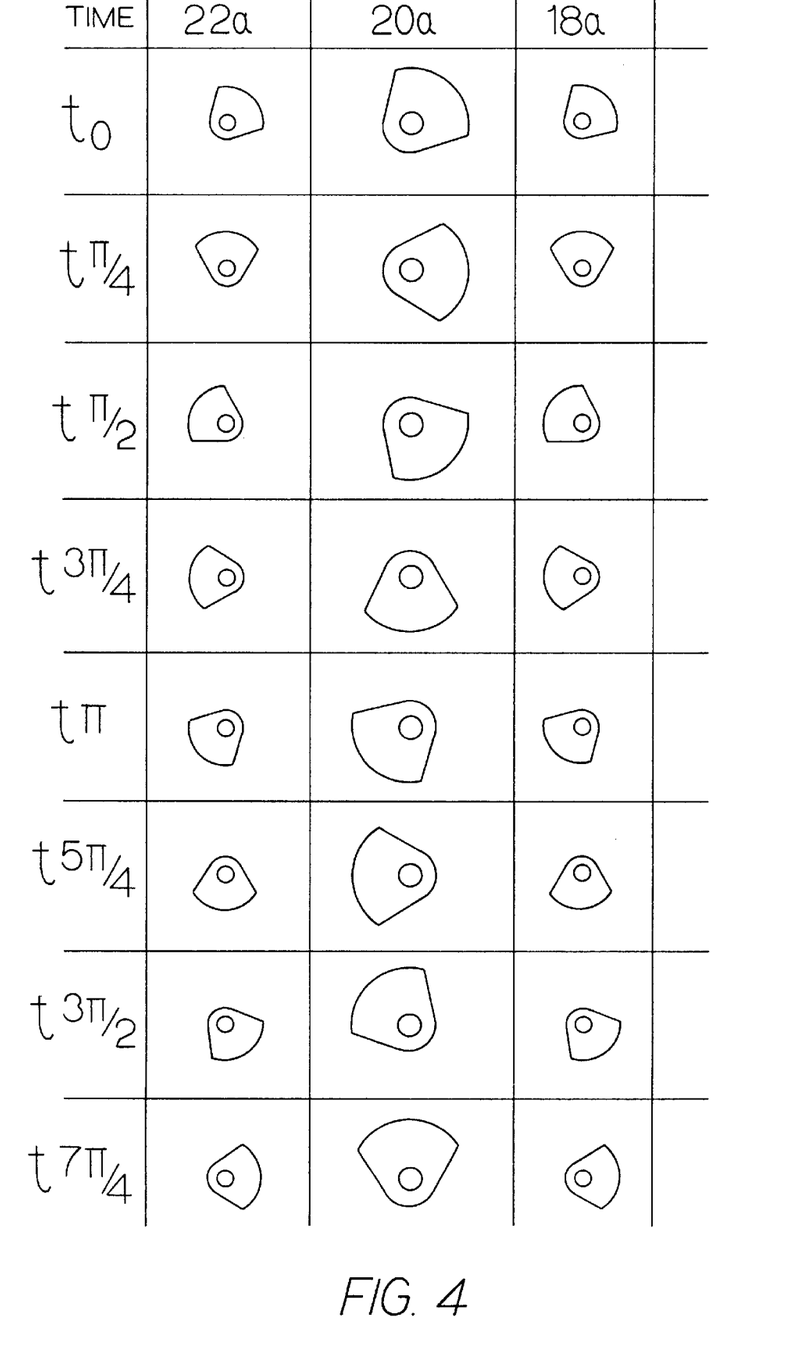
FIG. 4 is a depiction of the magnitude and direction of the forces produced by the eccentric weights of the apparatus illustrated in FIG. 1 when the weights are sized and oriented as described in Table 1.

As taught in the prior art, the resultant direction component varies linearly as the weights rotate if the weights 18a, 20a, 20b, 22a are sized such that the combined mass of the outermost weights 18a, 22a is essentially equal to the total mass borne by the intermediate shaft 20 (mass of intermediate weight 20a plus mass of intermediate weight 20b), and if the angular orientation for the weights 18a, 20a, 20b, 22a is selected such that the two outermost weights 18a, 22a have essentially the same orientation relative to each other. For example, as shown in Table 1 and as depicted schematically in FIGS. 4A–H, if the masses of the outermost weights 18a, 22a are each 25 lbs, the combined mass of the intermediate weights 20a, 20b is 50 lbs, and the angular orientation of each of the weights 18a, 20a, 20b, 22a at time zero, $t_0$, is essentially 45°, the resultant driving force produced by the weights 18a, 20a, 20b, 22a varies from 0 lbs (at times $t_{\pi/2}$ and $t_{3\pi/2}$) to 100 lbs (at times $t_0$ and $t_\pi$), and the resultant direction component is directed either at 45° or 225° from a horizontal plane "x" through the shafts 18, 20, 22 (as shown in FIG. 1), i.e. the direction varies linearly, when the motor is set to operate in a first, or forward, direction. As shown in Tables 2, 3 and 4, by changing the angular orientation of the weights 18a, 20a, 20b, 22a at $t_0$, the resultant direction changes, but still varies linearly.

TABLE 1

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 45° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 45° | 90° | 135° | 180° | 225° | 270° | 315° | 0° |
| 20a, 20b | 45° | 0° | 315° | 270° | 225° | 180° | 135° | 90° |
| Resultant Direction | 45° | 45° | — | 225° | 225° | 225° | — | 45° |
| Net Driving Force | 100# | 71# | 0# | 71# | 100# | 71# | 0# | 71# |

TABLE 2[a]

| Conditions: | mass of weight 18a = 25 lbs, $t_0$ position 0°; combined mass of weights 20a, 20b = 50 lbs, $t_0$ position 0°; mass of weight 22a = 25 lbs, to position 0° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 0° | 45° | 90° | 135° | 180° | 225° | 270° | 315° |
| 20a, 20b | 0° | 315° | 270° | 225° | 180° | 135° | 90° | 45° |
| Res. Direction | 0° | 0° | — | 180° | 180° | 180° | — | 0° |
| Net Dr. Force | 100# | 71# | 0# | 71# | 100# | 71# | 0# | 71# |

[a]Because the resultant direction has no vertical component, there is no force directed at the conveyor pan 12 to cause the product to move, so the product remains essentially stationary.

TABLE 3[b]

| Conditions: | mass of weight 18a = 25 lbs, $t_0$ position 90°; combined mass of weights 20a, 20b = 50 lbs, $t_0$ position 90°; mass of weight 22a = 25 lbs, $t_0$ position 90° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 90° | 135° | 180° | 225° | 270° | 315° | 0° | 45° |
| 20a, 20b | 90° | 45° | 0° | 315° | 270° | 225° | 180° | 135° |
| Res. Direction | 90° | 90° | — | 270° | 270° | 270° | — | 90° |
| Net Dr. Force | 100# | 71# | 0# | 71# | 100# | 71# | 0# | 71# |

[b]Because the net driving force is directed essentially perpendicular to the conveyor pan 12, the product simply bounces on the conveyor pan 12 without moving either downstream or upstream along the conveyor.

TABLE 4

| Conditions: | mass of weight 18a = 25 lbs, $t_0$ position 20°; combined mass of weights 20a, 20b = 50 lbs, $t_0$ position 20°; mass of weight 22a = 25 lbs, $t_0$ position 20° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 120° | 165° | 210° | 255° | 300° | 345° | 30° | 75° |
| 20a, 20b | 120° | 75° | 30° | 345° | 300° | 255° | 210° | 165° |
| Res. Direction | 120° | 120° | — | 300° | 300° | 300° | — | 120° |
| Net Dr. Force | 100# | 71# | 0# | 71# | 100# | 71# | 0# | 71# |

As further taught in the prior art, when product is conveyed using a linear force, operating the motor in a second or reverse direction does not, in and of itself, change the resultant force direction. For example, as shown in Table 1Rev, if the motor is reversed using the conditions of Table 1, the resultant direction remains the same as when the motor operated in the forward direction (see Table 1). To reverse the flow of the product, the weights 18a, 20a, 20b, 22a, must be repositioned, a time-consuming operation. For example, to reverse the flow of product from Table 1, the weights need to be effectively shifted by 90° (from an angle of +45° relative to the conveyor to an angle of −45° relative to the conveyor), as shown in Table 1Rev-Mod.

TABLE 1

Rev

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 45° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 45° | 0° | 315° | 270° | 225° | 180° | 135° | 90° |
| 20a, 20b | 45° | 90° | 135° | 180° | 225° | 270° | 315° | 0° |
| Res. Direction | 45° | 45° | — | 225° | 225° | 225° | — | 45° |
| Net Dr. Force | 100# | 71# | 0# | 71# | 100# | 71# | 0# | 71# |

TABLE 1

Rev-Mod

| Conditions: | mass of weight 18a = 25 lbs, $t_0$ position 135°; combined mass of weights 20a, 20b = 50 lbs, $t_0$ position 135°; mass of weight 22a = 25 lbs, $t_0$ position 135° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 135° | 18° | 225° | 270° | 315° | 0° | 45° | 90° |
| 20a, 20b | 135° | 90° | 45° | 0° | 315° | 270° | 225° | 180° |
| Res. Direction | 135° | 135° | — | 315° | 315° | 315° | — | 135° |
| Net Dr. Force | 100# | 71# | 0# | 71# | 100# | 71# | 0# | 71# |

Elliptical Motion of the Vibratory Trough

If the resultant direction component varies in a non-linear pattern as the weights 18a, 20a, 20b, 22a rotate about their respective shafts 18, 20, 22, an elliptical driving force is directed at the pan 12. That is, with the motor operating in the forward direction, the pan 12 is continually moved in a first direction, e.g., counter-clockwise, along a path that resembles an ellipse. As shown herein, the elliptical path is generated by sizing and positioning the weights 18a, 20a, 20b, 22a so that the resultant driving force cannot be essentially equal to zero at any point during a complete rotation. This can be accomplished by selecting the weights 18a, 20a, 20b, 22a so that the combined mass of the outermost weights 18a, 22a does not equal the combined mass of the intermediate weights 20a, 20b, or by positioning the weights 18a, 22a on the outermost shafts 18, 22 such that the weights 18a, 22a have different angular orientations at $t_0$ relative to each other, or by a combination thereof, provided the combination prevents the resultant driving force from being essentially equal to zero at any point during a complete rotation.

Figure 5:
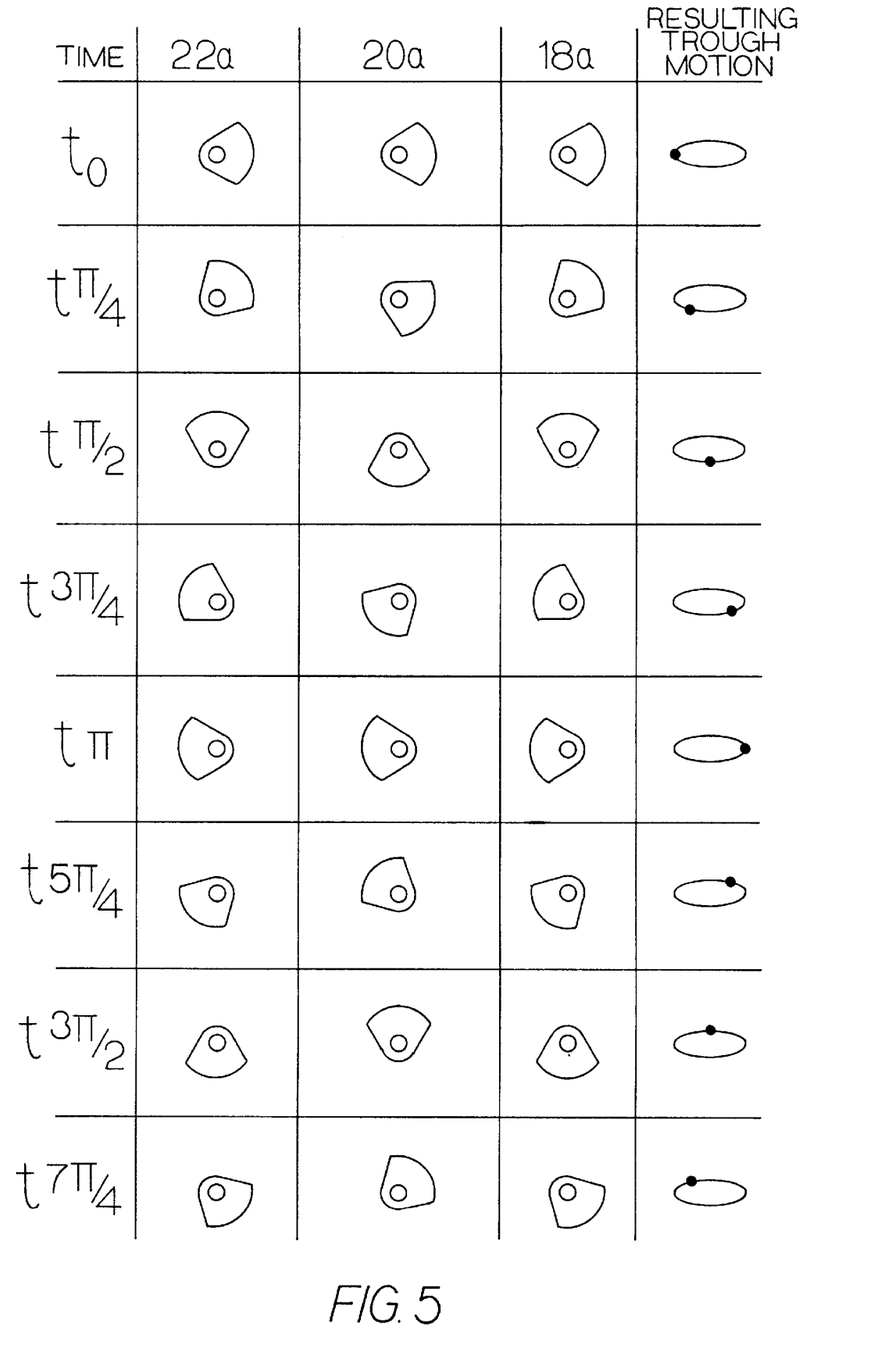
FIG. 5 is a depiction of the magnitude and direction of the forces produced by the eccentric weights of the apparatus illustrated in FIG. 1 when the weights are sized and oriented as described in Table 6.

For example, the weights 18a, 20a, 20b, 22a can be selected such that the combined mass of the outermost weights 18a, 22a does not equal the combined mass of the intermediate weights 20a, 20b. In this situation, because the outermost weights 18a, 22a rotate in one direction while the intermediate weights 20a, 20b are rotating in the opposite direction at the same rate, a net positive force will always be exerted in some direction. As shown in Table 5, if the masses of the weights 18a, 20a, 20b, 22a are each 33 lbs, and the angular orientation of the weights 18a, 20a, 20b, 22a at time zero, $t_0$, is essentially 45°, the resultant direction varies non-linearly as the resultant force produced by the weights varies from 33 lbs (at times $t_{\pi/2}$ and $t_{3\pi/2}$) to 99 lbs (at times $t_0$ and $t_\pi$). Table 6, which is shown schematically in FIGS. 5A–H, is the same as Table 5 except the angular orientation of the weights 18a, 20a, 20b, 22a at $t_0$ is essentially 0°. As shown in Table 7, the masses of the weights 18a, 20a, 20b, 22a, can vary relative to each other and the pan 12 can move with an elliptical motion.

When the motor is reversed, the pan 12 is moved along an essentially identical elliptical path as when the motor operates in the forward direction, except that the product moves in the opposite direction. That is, if as the motor operates in the forward direction, the pan 12 moves counterclockwise about the elliptical path, then as the motor operates in the reverse direction, the pan 12 moves clockwise about the elliptical path. More importantly, by reversing the rotational direction of the motor, the product effectively moves in the opposite direction along the conveyor pan 12. This symmetrical but reverse elliptical path is generated by simply reversing the motor, without any further adjustments to the weights 18a, 20a, 20b, 22a or shafts 18, 20, 22. Tables 5Rev, 6Rev and 7Rev show the effect of reversing the motor on the resultant direction and the resultant force for Tables 5, 6 and 7, respectively.

TABLE 5

| Conditions: | mass of weight 18a = 33 lbs, $t_0$ position 45°; combined mass of weights 20a, 20b = 33 lbs, $t_0$ position 45°; mass of weight 22a = 33 lbs, $t_0$ position 45° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 45° | 90° | 135° | 180° | 225° | 270° | 315° | 0° |
| 20a, 20b | 45° | 0° | 315° | 270° | 225° | 180° | 135° | 90° |
| Res. Direction | 45° | 63.4° | 135° | 206.6° | 225° | 243.4° | 315° | 26.6° |
| Net Dr. Force | 99# | 74# | 33# | 74# | 99# | 74# | 33# | 74# |

TABLE 6

| Conditions: | mass of weight 18a = 33 lbs, $t_0$ position 0°; combined mass of weights 20a, 20b = 33 lbs, $t_0$ position 0°; mass of weight 22a = 33 lbs, $t_0$ position 0° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 0° | 45° | 90° | 135° | 180° | 225° | 270° | 315° |
| 20a, 20b | 0° | 315° | 270° | 225° | 180° | 135° | 90° | 45° |
| Res. Direction | 0° | 18.4° | 90° | 161.6° | 180° | 198.4° | 270° | 341.6° |
| Net Dr. Force | 99# | 74# | 33# | 74# | 99# | 74# | 33# | 74# |

TABLE 7

| Conditions: | mass of weight 18a = 31 lbs, $t_0$ position 0°; combined mass of weights 20a, 20b = 38 lbs, $t_0$ position 0°; mass of weight 22a = 31 lbs, $t_0$ position 0° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a, 22a | 0° | 45° | 90° | 135° | 180° | 225° | 270° | 315° |
| 20a, 20b | 0° | 315° | 270° | 225° | 180° | 135° | 90° | 45° |
| Res. Direction | 0° | 13.5° | 90° | 166.5° | 180° | 193.5° | 270° | 346.5° |
| Net Dr. Force | 100# | 73# | 24# | 73# | 100# | 73# | 24# | 73# |

TABLE 5

Rev

Conditions: mass of weight 18a = 33 lbs, $t_0$ position 45°;
combined mass of weights 20a, 20b = 33 lbs, $t_0$ position 45°;
mass of weight 22a = 33 lbs, to position 45°

| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
|---|---|---|---|---|---|---|---|---|
| Angular Orientation of: | | | | | | | | |
| 18a, 22a | 45° | 0° | 315° | 270° | 225° | 180° | 135° | 90° |
| 20a, 20b | 45° | 90° | 135° | 180° | 225° | 270° | 315° | 0° |
| Res. Direction | 45° | 26.6° | 315° | 243.4° | 225° | 206.6° | 135° | 26.6° |
| Net Dr. Force | 99# | 74# | 33# | 74# | 99# | 74# | 33# | 74# |

TABLE 6

Rev

Conditions: mass of weight 18a = 33 lbs, $t_0$ position 0°;
combined mass of weights 20a, 20b = 33 lbs, $t_0$ position 0°;
mass of weight 22a = 33 lbs, $t_0$ position 0°

| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
|---|---|---|---|---|---|---|---|---|
| Angular Orientation of: | | | | | | | | |
| 18a, 22a | 0° | 315° | 270° | 225° | 180° | 135° | 90° | 45° |
| 20a, 20b | 0° | 45° | 90° | 135° | 180° | 225° | 270° | 315° |
| Res. Direction | 0° | 341.6° | 270° | 198.4° | 180° | 161.6° | 90° | 18.4° |
| Net Dr. Force | 99# | 74# | 33# | 74# | 99# | 74# | 33# | 74# |

TABLE 7

Conditions: mass of weight 18a = 33 lbs, $t_0$ position 0°;
combined mass of weights 20a, 20b = 33 lbs, $t_0$ position 0°;
mass of weight 22a = 33 lbs, $t_0$ position 0°

| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
|---|---|---|---|---|---|---|---|---|
| Angular Orientation of: | | | | | | | | |
| 18a, 22a | 0° | 315° | 270° | 225° | 180° | 135° | 90° | 45° |
| 20a, 20b | 0° | 45° | 90° | 135° | 180° | 225° | 270° | 315° |
| Res. Direction | 0° | 346.5° | 270° | 193.5° | 180° | 166.5° | 90° | 13.5° |
| Net Dr. Force | 100# | 73# | 24# | 73# | 100# | 73# | 24# | 73# |

Alternatively, if the weights 18a, 20a, 20b, 22a are selected such that the combined mass of the outermost weights 18a, 22a is essentially equal to the mass of the intermediate weight 20a, 20b the force direction can be varied non-linearly by positioning the weights on the outermost shafts 18, 22 such that the weights 18a, 22a have different angular orientations at $t_0$ relative to each other. For example, with the weight masses having a ratio of 1:2:1 (for the weights 18a:20a:22a, respectively), allowing the outermost weights 18a, 22a to have different angular orientations at $t_0$ relative to each other prevents the weights 18a, 22a from generating an equal but opposite force relative to the intermediate weight 20a, 20b as is required for the resultant driving force to equal essentially zero. The effect of varying the $t_0$ angular orientations for the outermost weights 18a, 22a is shown by comparing the resultant direction and resultant driving force for Table 8 with Table 1. (Table 8 is the same as Table 1 except that the outermost weights 18a, 22a differ in angular orientation by 90° throughout the rotation.) Similar, but more subtle, results are observed when the outermost weights 18a, 22a differ in angular orientation by 45° throughout the rotation, as shown in Table 9. The effect of reversing the motor on the resultant direction and resultant force for Tables 8 and 9 is shown in Tables 8Rev and 9Rev, respectively. Again, as the motor operates in the forward direction, the pan 12 moves counterclockwise about the elliptical path, and as the motor operates in the reverse direction, the pan 12 moves clockwise about the elliptical path. This symmetrical but reverse elliptical path is generated by simply reversing the motor, without any further adjustments to the weights 18a, 20a, 20b, 22a or shafts 18, 20, 22.

TABLE 8

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 135° | | | | | | | |
|---|---|---|---|---|---|---|---|---|
| Time | $t_0$ | $t_{\pi/4}$ | $t_{\pi/2}$ | $t_{3\pi/4}$ | $t_{\pi}$ | $t_{5\pi/4}$ | $t_{3\pi/2}$ | $t_{7\pi/4}$ |
| Angular Orientation of: | | | | | | | | |
| 18a | 45° | 90° | 135° | 180° | 225° | 270° | 315° | 0° |
| 20a, 20b | 45° | 0° | 315° | 270° | 225° | 180° | 135° | 90° |
| 22a | 135° | 180° | 225° | 270° | 315° | 0° | 45° | 90° |
| Res. Direction | 63.4° | 45° | 270° | 251.6° | 243.4° | 225° | 90° | 71.6° |
| Net Dr. Force | 79# | 35# | 35# | 79# | 79# | 35# | 35# | 79# |

TABLE 9

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 90° | | | | | | | |
|---|---|---|---|---|---|---|---|---|
| Time | $t_0$ | $t_{\pi/4}$ | $t_{\pi/2}$ | $t_{3\pi/4}$ | $t_{\pi}$ | $t_{5\pi/4}$ | $t_{3\pi/2}$ | $t_{7\pi/4}$ |
| Angular Orientation of: | | | | | | | | |
| 18a | 45° | 90° | 135° | 180° | 225° | 270° | 315° | 0° |
| 20a, 20b | 45° | 0° | 315° | 270° | 225° | 180° | 135° | 90° |
| 22a | 90° | 135° | 180° | 225° | 270° | 315° | 0° | 45° |
| Res. Direction | 34.2° | 32.2° | 22.5° | 217.1° | 214.2° | 212.2° | 202.5° | 37.1° |
| Net Dr. Force | 94# | 80# | 19# | 54# | 94# | 80# | 19# | 54# |

TABLE 8

Rev

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 135° | | | | | | | |
|---|---|---|---|---|---|---|---|---|
| Time | $t_0$ | $t_{\pi/4}$ | $t_{\pi/2}$ | $t_{3\pi/4}$ | $t_{\pi}$ | $t_{5\pi/4}$ | $t_{3\pi/2}$ | $t_{7\pi/4}$ |
| Angular Orientation of: | | | | | | | | |
| 18a | 45° | 0° | 315° | 270° | 225° | 180° | 135° | 90° |
| 20a, 20b | 45° | 90° | 135° | 180° | 225° | 270° | 315° | 0° |
| 22a | 135° | 90° | 45° | 0° | 315° | 270° | 225° | 180° |
| Res. Direction | 63.4° | 71.6° | 90° | 225° | 243.4° | 251.6° | 270° | 45° |
| Net Dr. Force | 79# | 79# | 35# | 35# | 79# | 79# | 35# | 35# |

TABLE 9

Rev

| Conditions: | mass of weight 18a = 25 lbs, $t_0$ position 45°; combined mass of weights 20a, 20b = 50 lbs, $t_0$ position 45°; mass of weight 22a = 25 lbs, $t_0$ position 90° | | | | | | | |
|---|---|---|---|---|---|---|---|---|
| Time | $t_0$ | $t_{\pi/4}$ | $t_{\pi/2}$ | $t_{3\pi/4}$ | $t_{\pi}$ | $t_{5\pi/4}$ | $t_{3\pi/2}$ | $t_{7\pi/4}$ |
| Angular Orientation of: | | | | | | | | |
| 18a | 45° | 0° | 315° | 270° | 225° | 180° | 135° | 90° |
| 20a, 20b | 45° | 90° | 135° | 180° | 225° | 270° | 315° | 0° |
| 22a | 0° | 315° | 270° | 225° | 180° | 135° | 90° | 45° |
| Res. Direction | 34.2° | 37.1° | 202.5° | 212.2° | 214.2° | 217.1° | 22.5° | 32.2° |
| Net Dr. Force | 94# | 54# | 19# | 80# | 94# | 54# | 19# | 80# |

The resultant force direction can also be varied non-linearly by positioning the weights on the outermost shafts 18, 22 such that the weights 18a, 22a have different angular orientations at $t_0$ relative to each other, and by selecting the weights 18a, 20a, 20b, 22a such that the combined mass of the outermost weights 18a, 22a does not equal the combined mass of the intermediate weights 20a, 20b. For example, in Table 10 the shafts 18, 20a, 22 bear essentially the same masses, similar to Tables 5 and 6, but the outermost weights 18a, 22a differ in angular orientation by 90° throughout the rotation. As in the prior examples, by simply reversing the motor, without any further adjustments to the weights 18a,

20a, 20b, 22a or shafts 18, 20, 22, the direction in which the product moves about the elliptical path can be changed from counterclockwise (Table 10) to clockwise (Table 10Rev).

TABLE 10

| Conditions: | mass of weight 18a = 33 lbs, $t_0$ position 45°; combined mass of weights 20a, 20b = 33 lbs, $t_0$ position 45°; mass of weight 22a = 33 lbs, $t_0$ position 90° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a | 45° | 90° | 135° | 180° | 225° | 270° | 315° | 0° |
| 20a, 20b | 45° | 0° | 315° | 270° | 225° | 180° | 135° | 90° |
| 22a | 135° | 180° | 225° | 270° | 315° | 0° | 45° | 90° |
| Res. Direction | 71.6° | 90° | 225° | 243.4 | 251.6° | 270° | 45° | 63.4° |
| Net Dr. Force | 74# | 33# | 33# | 74# | 74# | 33# | 33# | 74# |

TABLE 10 Rev

| Conditions: | mass of weight 18a = 33 lbs, $t_0$ position 45°; combined mass of weights 20a, 20b = 33 lbs, $t_0$ position 45°; mass of weight 22a = 33 lbs, $t_0$ position 90° | | | | | | | |
|---|---|---|---|---|---|---|---|---|
| Time | $t_0$ | $t_{\pi/4}$ | $t_{\pi/2}$ | $t_{3\pi/4}$ | $t_\pi$ | $t_{5\pi/4}$ | $t_{3\pi/2}$ | $t_{7\pi/4}$ |
| Angular Orientation of: | | | | | | | | |
| 18a | 45° | 0° | 315° | 270° | 225° | 180° | 135° | 90° |
| 20a, 20b | 45° | 90° | 135° | 180° | 225° | 270° | 315° | 0° |
| 22a | 135° | 90° | 45° | 0° | 315° | 270° | 225° | 180° |
| Res. Direction | 71.6° | 63.4° | 45° | 270° | 251.6° | 243.4° | 225° | 90° |
| Net Dr. Force | 74# | 74# | 33# | 33# | 74# | 74# | 33# | 33# |

In a preferred embodiment of the present invention, each shaft 18, 20, 22 bears one weight 18a, 20a, 22a, and masses of the weights 18a, 20a and 22a are proportioned 31:38:31 (1:1.225:1). At a time zero, $t_0$, all of the weights 18a, 20a, 22a have essentially the same angular orientation with respect to their associated shafts 18, 20, 22. Upon starting the motor 36, the shafts 18 and 22 are driven in a first direction, ie. counter-clockwise, and shaft 20 is driven in a second opposite rotational direction, i.e. clockwise, causing the weights 18a, 20a, 22a to change angular orientation. In the most preferred embodiment, the ellipse generated has a length that is approximately four times its width.

It is understood that, in light of a reading of the foregoing description and drawings, those with ordinary skill in the art will be able to make changes and modifications to the present invention without departing from the spirit or scope of the invention, as defined herein.

What is claimed is:

1. A vibrating conveyor, powered by a reversible motor, for moving a conveyor trough in a first direction along a non-linear path when said motor is operating in the forward direction, and for moving said conveyor trough in a second direction along an essentially symmetric non-linear path when said motor is operating in the reverse direction, said conveyor comprising
   said conveying trough for moving product through vibratory motion imparted to said trough;
   a stationary frame;
   a plurality of spring members mounting said trough on said frame; and
   a vibrating assembly for imparting vibratory motion to said trough, said assembly comprising
   three essentially parallel shafts, defining two outermost shafts and an intermediate shaft, adapted to be rotated to generate said vibratory motion;
   at least one eccentric weight per said parallel shaft, each eccentric weight having a mass and being fixedly attached to said shaft, the individual weights being selected and positioned on said shafts so that the resultant driving force is a non-zero value throughout a 360° rotation of said shafts; and
   a drive means, including a reversible motor, for rotating said shafts such that the outermost shafts and associated weights rotate in the first direction and the intermediate shaft and associated weights rotate in the second direction opposite to the first direction of the outermost weights.

2. A vibrating conveyor apparatus as recited in claim 1 wherein said outermost shafts bear essentially the same mass, and the intermediate shaft bears a different mass than either of said outermost shafts.

3. A vibrating conveyor apparatus as recited in claim 2 wherein said weights each have the same angular orientation at least one point during a 360° rotation of said shafts.

4. A vibrating conveyor apparatus as recited in claim 1 wherein each of said outermost shafts bear essentially the same mass, and wherein said intermediate shaft bears approximately 22.5% greater mass than either of said outermost shafts.

5. A vibrating conveyor apparatus as recited in claim 4 wherein at least one of said shafts bears a plurality of weights fixedly attached intermediate the ends thereof.

6. A vibrating conveyor apparatus as recited in claim 4 wherein said weights on said outermost shafts have different angular orientations relative to each other throughout a 360° rotation of said shafts.

7. A vibrating conveyor apparatus as recited in claim 4 wherein each of said shafts bears one eccentric weight fixedly attached intermediate the ends thereof.

8. A vibrating conveyor apparatus as recited in claim 7 wherein said weights each have the same angular orientation at at least one point during a 360° rotation of said shafts.

9. A vibrating conveyor apparatus as recited in claim 5 wherein said weights each have the same angular orientation at at least one point during a 360° rotation of said shafts.

10. A vibrating conveyor, powered by a reversible motor, for moving a conveyor trough in a first direction along a non-linear path when said motor is operating in the forward direction, and for moving said conveyor trough in a second direction along an essentially symmetric non-linear path when said motor is operating in the reverse direction, said conveyor comprising said conveying trough for moving product through vibratory motion imparted to said trough;

a stationary frame;

a plurality of spring members mounting said trough on said frame; and a vibrating assembly for imparting vibratory motion to said trough, said assembly comprising three essentially parallel shafts, defining two outermost shafts and an intermediate shaft, adapted to be rotated to generate said vibratory motion, each of said shafts having an eccentric weight fixedly attached to said shaft, each of said weights having essentially the same mass and being positioned on said shafts so that the angular orientations of said weights on the outermost shafts are essentially the same throughout a 360° rotation of said shafts; and a drive means, including a reversible motor, for rotating said shafts such that the outermost shafts and associated weights rotate in the first direction and the intermediate shaft and associated weights rotate in the second direction opposite to the first direction of the outermost weights.

11. A vibrating conveyor, powered by a reversible motor, for moving a conveyor trough in a first direction along a non-linear path when said motor is operating in the forward direction, and for moving said conveyor trough in a second direction along an essentially symmetric non-linear path when said motor is operating in the reverse direction, said conveyor comprising said conveying trough for moving product through vibratory motion imparted to said trough;

a stationary frame;

a plurality of spring members mounting said trough on said frame; and a vibrating assembly for imparting vibratory motion to said trough, said assembly comprising three essentially parallel shafts, defining two outermost shafts and an intermediate shaft, adapted to be rotated to generate said vibratory motion, each of said shafts having an eccentric weight fixedly attached to said shaft, said weights being selected and positioned on said shafts such that the weights on the outermost shafts have essentially the same mass and angular orientations relative to each other throughout a 360° rotation of said shafts, and the weight on the intermediate shaft has a different mass than said weights on said outermost shafts; and a drive means including a reversible motor for rotating said shafts such that the outermost shafts and associated weights rotate in the first direction and the intermediate shaft and associated weights rotate in the second direction opposite to the first direction of the outermost weights.

* * * * *